United States Patent
Biswas et al.

(10) Patent No.: US 9,679,288 B2
(45) Date of Patent: Jun. 13, 2017

(54) SYSTEMS AND METHODS FOR PRODUCT PURCHASE AND REGISTRATION

(75) Inventors: Sanjeev Biswas, Bangalore (IN); Daniel C. Brotsky, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 241 days.

(21) Appl. No.: 13/590,852

(22) Filed: Aug. 21, 2012

(65) Prior Publication Data
US 2014/0058863 A1 Feb. 27, 2014

(51) Int. Cl.
*G06Q 10/08* (2012.01)
*G06Q 20/34* (2012.01)
*G06Q 30/06* (2012.01)

(52) U.S. Cl.
CPC ......... *G06Q 20/354* (2013.01); *G06Q 10/087* (2013.01); *G06Q 30/06* (2013.01)

(58) Field of Classification Search
CPC .... G06Q 20/20; G06Q 20/40; G06Q 20/3278; G06Q 20/3276; G06Q 20/203; G06Q 20/354
USPC .............................................. 705/14, 21, 44
See application file for complete search history.

(56) References Cited

U.S. PATENT DOCUMENTS

| 6,934,533 | B2 | 8/2005 | Joyce et al. | |
|---|---|---|---|---|
| 7,097,094 | B2* | 8/2006 | Lapstun | G06F 3/014 235/375 |
| 7,209,903 | B1 | 4/2007 | Mamdani et al. | |
| 7,234,061 | B1* | 6/2007 | Diab | H04L 9/3236 380/2 |
| 7,933,589 | B1 | 4/2011 | Mamdani et al. | |
| 8,108,977 | B1* | 2/2012 | Miller | G06Q 20/204 26/82 |
| 8,489,452 | B1* | 7/2013 | Warner | G06Q 30/0226 705/14.34 |
| 8,683,579 | B2* | 3/2014 | Zhang | G06F 21/121 726/19 |
| 2002/0010623 | A1* | 1/2002 | McCollom et al. | 705/14 |
| 2002/0091573 | A1 | 7/2002 | Hodes | |
| 2005/0246230 | A1* | 11/2005 | Murray | G06Q 30/0236 705/14.36 |
| 2007/0109103 | A1 | 5/2007 | Jedrey et al. | |
| 2008/0046376 | A1* | 2/2008 | Cook | G06F 21/121 705/55 |
| 2009/0144164 | A1* | 6/2009 | Wane | G06Q 20/10 705/17 |
| 2009/0247131 | A1* | 10/2009 | Champion | H04W 8/22 455/411 |

(Continued)

FOREIGN PATENT DOCUMENTS

| GB | 2483318 | 3/2012 |
|---|---|---|
| WO | 0039657 A2 | 7/2000 |

*Primary Examiner* — Ryan Zeender
*Assistant Examiner* — Milena Racic
(74) *Attorney, Agent, or Firm* — Kilpatrick Townsend & Stockton LLP

(57) ABSTRACT

Systems and methods for product purchase and registration are disclosed. One disclosed method includes the steps of capturing a product identifier, the product identifier identifying a product; transmitting the product identifier to a first remote server; responsive to transmitting the product identifier, receiving a vendor identification number (VIN), the VIN based on the product identifier; providing the VIN to a point-of-sale (POS) device; and activating the product.

13 Claims, 7 Drawing Sheets

(56) References Cited

U.S. PATENT DOCUMENTS

| | | | |
|---|---|---|---|
| 2010/0293536 A1* | 11/2010 | Nikitin | G06F 21/10 717/168 |
| 2011/0251892 A1 | 10/2011 | Laracey | |
| 2012/0072313 A1* | 3/2012 | McGrath et al. | 705/27.1 |
| 2012/0084181 A1* | 4/2012 | Miura | G06Q 20/12 705/27.1 |
| 2012/0209686 A1* | 8/2012 | Horowitz et al. | 705/14.26 |
| 2012/0259711 A1* | 10/2012 | Jabbawy | G06Q 30/0251 705/14.72 |

* cited by examiner

| Redemption Code | Vendor Identification Number | Reserved Flag (U/R) | Sold Flag (U/S) | Activated Flag (U/A) |
|---|---|---|---|---|
| A15Ry0234R | ADBECS6004xc4 | R | U | U |
| A52Fc1253X | ADBECS6041bv5 | R | S | U |
| Fv56jd5WE1 | ADBEACRX7xc34T | R | S | A |
| ... | ... | ... | ... | ... |

Figure 7

SYSTEMS AND METHODS FOR PRODUCT PURCHASE AND REGISTRATION

BACKGROUND

Customers purchasing certain types of products in stores may be required to use a redemption code to activate the purchased product prior to using it. For example, a gift card that can be used to purchase items, such as a pre-paid debit card, typically requires the buyer to purchase the card and then activate the card using a redemption code imprinted on the card. To prevent persons from simply copying redemption codes from unpurchased gift cards and activating the cards, various systems have been put in place to require purchase of the card prior to activation. For example, when a person purchases a gift card, information about the gift card being purchased is sent to the provider of the gift card, who marks the card as being "sold" and thus available to be activated when the purchaser later enters the redemption code. If a person enters a redemption code for a gift card that is not marked as "sold," the activation fails and the gift card remains inactive.

SUMMARY

The present disclosure describes embodiments of systems and methods for product purchase and registration. For example, one disclosed method includes capturing a product identifier, the product identifier identifying a product; transmitting the product identifier to a first remote server; responsive to transmitting the product identifier, receiving a vendor identification number (VIN), the VIN based on the product identifier; providing the VIN to a point-of-sale (POS) device; and purchasing the product. In another embodiment, a computer-readable medium comprises program code for causing one or more processors to execute such a method.

These illustrative embodiments are mentioned not to limit or define the disclosure, but rather to provide examples to aid understanding thereof. Illustrative embodiments are discussed in the Detailed Description, which provides further description of the disclosure. Advantages offered by various embodiments of this disclosure may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 7 shows a database record for product purchase and registration according to one embodiment.

DETAILED DESCRIPTION

Figure 1:
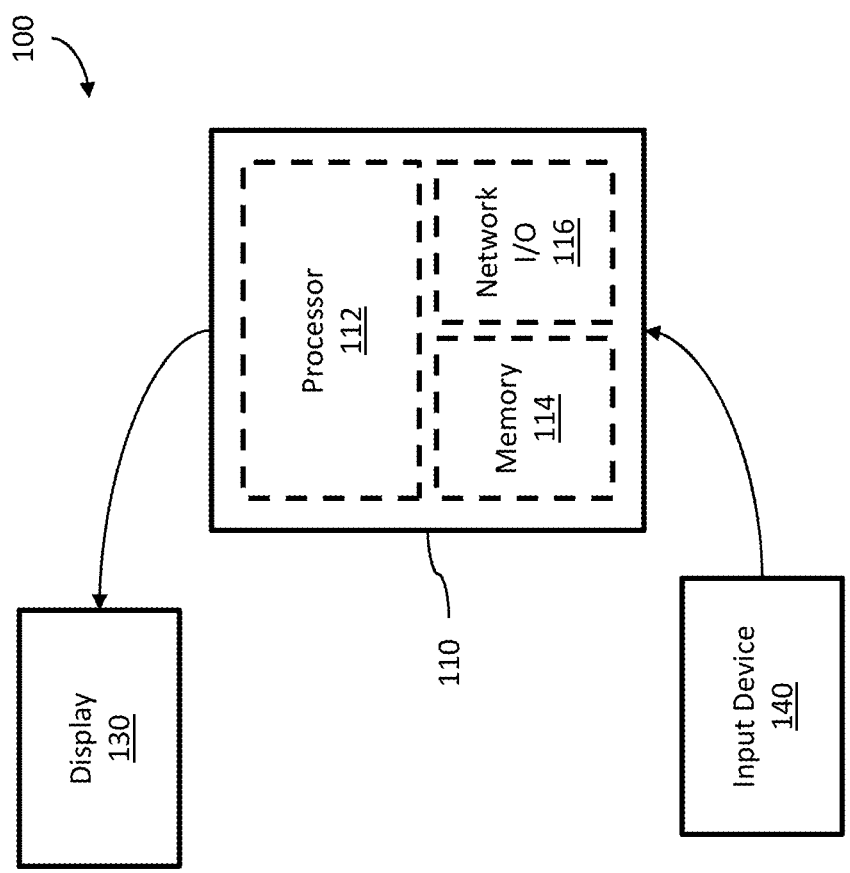
FIGS. 1-4 show systems for product purchase and registration according to embodiments.

Example embodiments are described herein in the context of systems and methods for product purchase and registration. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

Illustrative Method for Product Purchase and Registration

In one illustrative embodiment according to this disclosure, a user installs an application on her smartphone and uses the application to access a user account she has previously created with a software publisher (e.g. Adobe®). The user then locates a product within a store that she wishes to purchase. For example, in this example, the user locates a software product that she wishes to buy.

In a traditional shopping scenario, the user may take a box containing the software from the shelf, or may take a small paper card with a universal product code (UPC), quick response (QR) code, or similar code imprinted on it, to a cashier to purchase the item. If the user brings the paper card, the cashier or another store employee may then retrieve the actual item to be purchased from storage. The cashier scans the UPC code and the user pays for the item. Upon returning home, the user installs the software and then, when prompted, enters a product redemption code to activate the software and render it useable.

According to this illustrative embodiment, however, once the user locates the product she wishes to purchase, the user activates the software application and uses a camera built into the smartphone to take a photo of a QR code, a UPC, or similar code for the product she wishes to purchase. The software application transmits the product code to a server, which then provides a vendor (or publisher) identification number (VIN) associated with the product. The user then proceeds to a cashier, who scans the VIN with a point-of-sale (POS) device. The POS device uses the UPC code to determine the price of the item and also transmits the VIN to the publisher's server. The publisher marks a copy of the product associated with the VIN as being "sold" and sends a confirmation response to the POS device. The cashier also scans the UPC or other identifier, which allows the POS device to determine the store's price for the item. The user pays for the product and the purchase is completed.

At a later time, the user returns home and accesses a web site associated with the software produce she purchased and enters her access credentials (such as a username and password) to access her account, the account being the same account previously accessed using the software application on her smartphone. After accessing her user account, the user is able to download and install the purchased product without the need to either receive or enter a redemption or similar code. Rather, the software publisher has already "provisioned" a copy of the product for the user's account. Thus, the user is not required to receive and maintain a redemption code.

In this illustrative embodiment, the user was able to purchase, register, install, and use a software product without acquiring a physical article from a store and without receiving a redemption code from the software publisher. Instead, provisioning of the product occurs automatically based on the user's account information and the purchase of the product. The user simply needed to capture an image of a QR code to obtain the information necessary to purchase the software from the store and to activate the software for use. Thus, a store may save substantially on shelf and storage space as the number of physical copies of software products may be reduced or eliminated. In addition, a software publisher may save manufacturing costs by not producing, or producing fewer, physical copies of a software product and associated media. Further, a user may be able to more quickly and easily purchase and register a software product.

In another illustrative embodiment, the user may obtain an electronic scanner upon entering a store with a pre-loaded software application, rather than requiring that the user have a smart phone with an installed software application. For example, the user may enter access credentials into the scanner to activate the software application to capture codes for products for purchase. In some embodiments, the user may also be able to swipe a credit card on the scanner to allow the user to browse through the store, capture codes for items for purchase, and complete the purchase all without the need to wait in line for a cashier. As described above, for software products, the purchases and redemption codes may be automatically associated with the user's account such that the user is able to later activate, download and install the software product. Further, as will be described in greater detail below, the user may opt to transfer a redemption code to another person rather than provisioning the product for her own use. For example, a person may purchase a software product as a gift for another person, and select an option to transfer the redemption code to the other person's account (or generate an email requesting the user create an appropriate account to receive and use the redemption code). Thus, embodiments according to this disclosure may streamline the purchase and activation process for software products. Further, embodiments may allow a retail store to more easily and efficiently provide a wide variety of software products to its customers, but with a reduced requirement for shelf and inventory storage space.

These illustrative examples are given to introduce the reader to the general subject matter discussed herein and this disclosure is not limited to these examples. The following sections describe various additional non-limiting embodiments and examples of devices, systems, and methods for product purchase and registration.

Referring now to FIG. 1, FIG. 1 shows a system for product purchase and registration according to one embodiment. The system 100 shown in FIG. 1 comprises a handheld device 110, which comprises a processor 112, a memory 114, and a network interface 116, where the processor 112 is in communication with the memory 114 and the network interface 116. The handheld device 110 is in communication with a display 130 and an input device 140, as well as storage device 120.

In some embodiments, the device 110 may comprise a smartphone or tablet computer in which the display and input device 140 are bodily integrated into the device 110. In other embodiments, the device 110 may be a dedicated scanning device, such as a modified barcode scanner or similar scanner. In some configurations, one or both of the display 130 and input device 140 may be bodily incorporated into the device 110 or may be coupled to the device 116, such as via a wired connection, such as a universal serial bus (USB) connection, or a wireless connection, such as Bluetooth. In some embodiments, the device 110 may comprise a conventional laptop or desktop computer, or a point-of-sale device such as a cash register.

In the embodiment shown in FIG. 1, the processor 112 is in communication with memory 114 and is configured to execute a software application that provides product purchase and registration according to various embodiments. The software application may be stored within the memory 114 or in another memory, either local to or remote from the device 110. The software application, as will be described in greater detail below, is configured to receive a product identifier, communicate information based on the product identifier to a remote server, and receive information related to activating the product from the remote server.

In the embodiment shown in FIG. 1, memory 114 comprises two types of memory, random access memory (RAM) for program execution, and non-volatile memory, such as flash memory, which is configured store and persist data. In some embodiments, the non-volatile memory may comprise memories such as a hard disk or flash drive, coupled to or disposed within the device 116. Thus, in some embodiments, the device 110 may be capable of storing captured data or storing other data used during execution of the software application.

In some embodiments, the input device 140 may comprise a touch-sensitive input device (e.g. a touchscreen), a keyboard or keypad, a stylus, or a camera. For example, in one embodiment, the product purchase and registration application may be configured to capture an image using a camera 140 connected to the device 110. In some embodiments, the input device 140 may be configured to provide commands to the product purchase and registration application. For example, in one embodiment, the input device 140 comprises a keypad or a touch-sensitive input device to allow a user to enter information into the software application.

Signals from the input device 140 may be transmitted to the computer via a communications bus, such as USB, FireWire, or other suitable communications interface. The processor 112 receives such signals and processes them to determine actions responsive to said signals. For example, if signals received from the input device 140 comprise video frames, the processor 112 may receive the signals and provide information from the signals to the product purchase and registration application to process the frames.

In some embodiments, the display 130 may comprise an LED or LCD or similar multi-purpose display device. For example, in one embodiment in which the device 110 comprises a smartphone, the display 130 may comprise an LED display. However, in some embodiments, the display 130 may comprise a more simplistic display, such as a 7-segment display or one or more individual light emitting diodes to indicate status, such as to indicate a good or bad capture of a product identifier, transmission of data to a network, etc. In some embodiments, display may comprise a printer to print a redemption code onto paper.

In the embodiment shown in FIG. 1, the device 110 comprises a network interface 116, which is in communication with the processor 112 and provides wired or wireless communications, from the device 110 to a network or other components or other devices. For example, the network interface 116 may comprise a PCI network adapter, a USB network adapter, or an Ethernet adapter. The network interface 116 may communicate using wireless Ethernet, including 802.11a, g, b, or n standards, or cellular telephone protocols, such as GSM, EDGE, 3G, CDMA, or other suitable wireless networks. In one embodiment, the network interface 116 can communicate using Bluetooth or other wireless communication media. In other embodiments, the network interface 116 may communicate through a wired connection and may be in communication with one or more networks, such as Ethernet, token ring, USB, FireWire 1394, fiber optic, etc. And while the embodiment shown in FIG. 1 comprises a network interface 116, other embodiments may not comprise a network interface 116.

Figure 2:
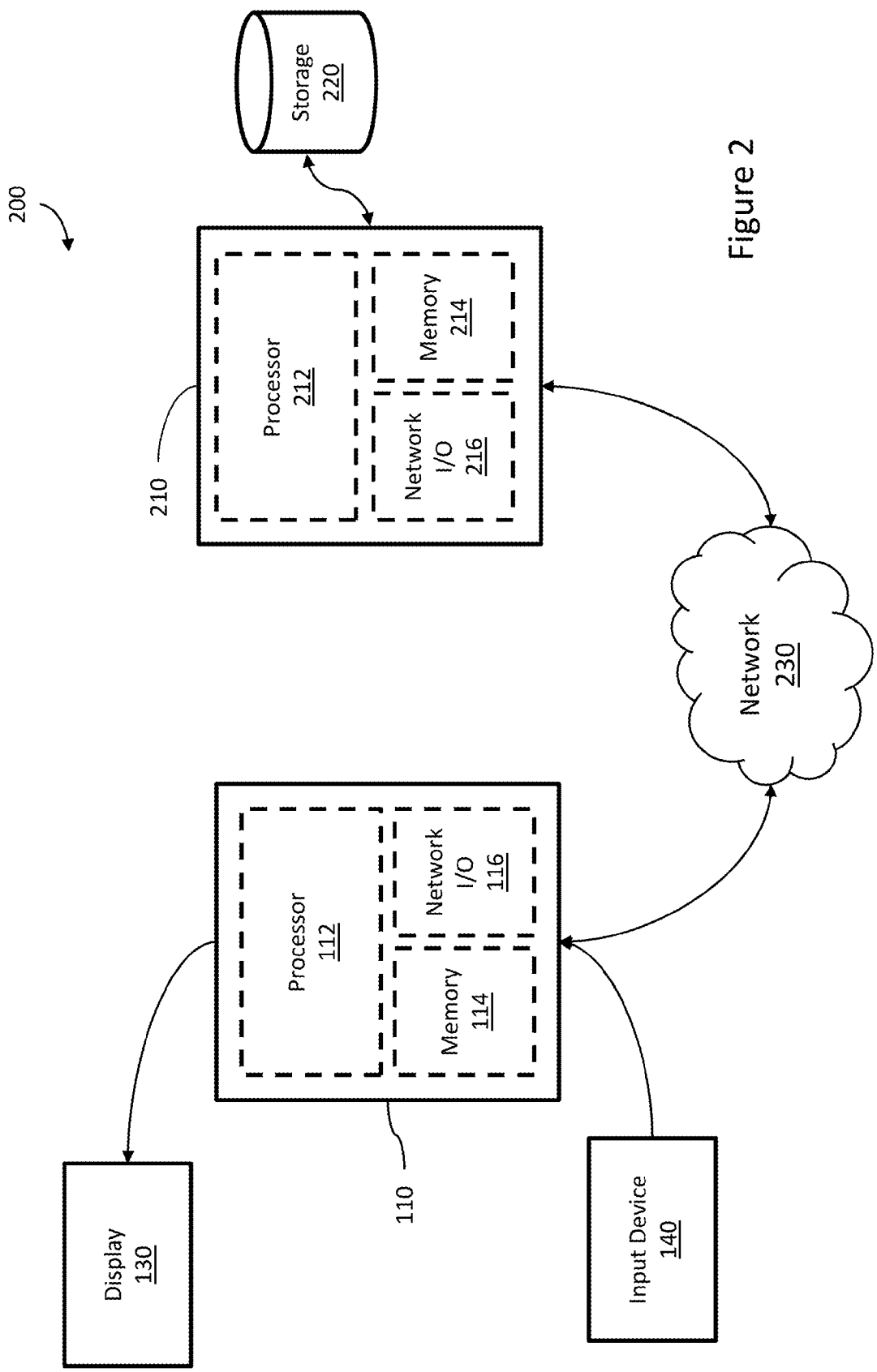

Referring now to FIG. 2, FIG. 2 shows a system 200 for product purchase and registration according to one embodiment of the present disclosure. The system 200 shown in FIG. 2 comprises system 100. In addition, system 100 is in communication with second computer 210 via network 230. In the embodiment shown in FIG. 2, the second computer 210 comprises a processor 212, a computer-readable medium 214, and a network interface 216, and is in communication with storage device 220.

In the embodiment shown in FIG. 2, device 110 is configured to execute a software application for product purchase and registration and the remote computer 210 is configured to receive data from the device 110 related to product purchase or registration. For example, the client computer 110 reads and interprets captured product information, such as a QR code, and transmits information based on the product information to the remote computer 210 via the network 230. The processor 212 in the second computer is configured to receive the information and perform product purchase or registration processes and provide information to the device 110 via the network 230 as will be described in greater detail below. The processor 112 at the device 110 receives the signals from the second computer 210 and may generate one or more display signals based on the signals from the second computer 210. The processor 112 then transmits the display signals to the display 130, which displays one or more images based on the display signals.

Figure 3:
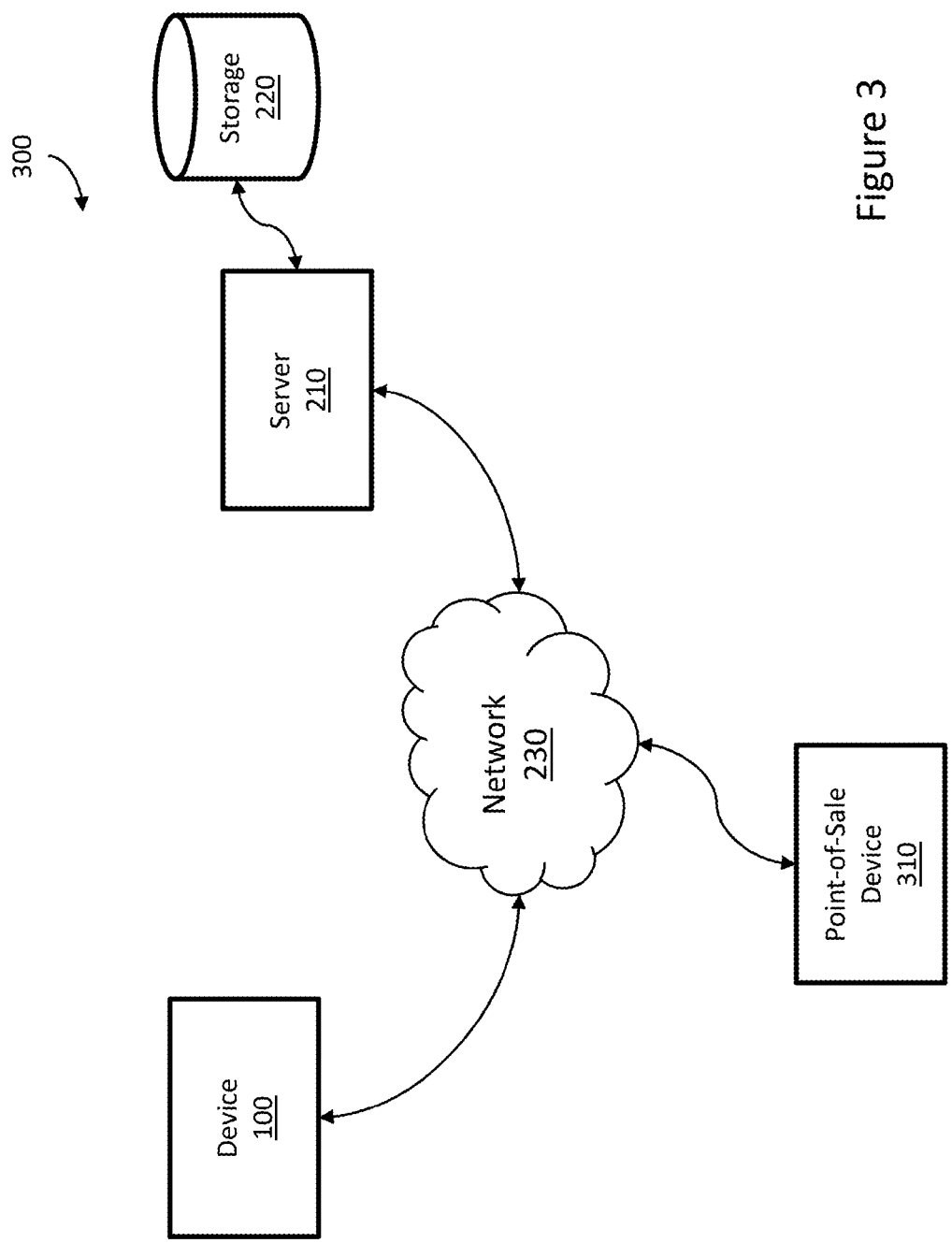

Referring now to FIG. 3, FIG. 3 shows a system for product purchase and registration according to one embodiment. The system 300 shown in FIG. 3 comprises the device 100 shown in FIG. 1, the server 210, storage 220, and network 230 shown in FIG. 2, and a point-of-sale (POS) device 310 in communication with the network 230. Any suitable POS device may be used according to various embodiments. For example, in one embodiment, the POS device may comprise a cash register and associated scanner device. In another embodiment, the POS device may comprise a self-service POS device, such as a POS device having a scanner, a touchscreen input device, and a credit card reader. Still further suitable POS devices may be employed in various embodiments.

In the embodiment shown, the system 300 is configured to provide product purchase and registration according to one embodiment. In the system 300 shown in FIG. 3, the device 100, server 210, and POS device 310 each provide functionality related to purchasing and registering a product. In this embodiment, a customer uses the device to capture a product code of a desired product. The device is configured to transmit information based on the product code to the server 210. The server creates or modifies a record in storage 220 associated with the received information and marks the record as "unsold" and "inactive." Because the record is marked unsold, it is ineligible for activation. The server 210 also generates purchase information, e.g. comprising a vendor ID number (VIN), a universal product code (UPC), and a redemption code, based on the received information. The server 210 then transmits at least some of the purchase information to the device 100, such as the VIN and the UPC, and marks the record as reserved or with a similar indicator to indicate that the record may be purchased by a particular customer. Such a feature may prevent the same purchase information from being provided to multiple customers. In some embodiments, the redemption code is not transmitted to the device 100, but rather is simply associated with the customer's account, though in some embodiments, the redemption code may be transmitted to the device, or may be requested by the customer. The customer then approaches the POS device, such as a cash register with a scanner operated by a cashier. The customer causes the device 100 to display the UPC code and/or the VIN, which the cashier scans. The POS receives the scanned data and transmits it to the server 210, which marks the record in storage 220 as being "sold" and thus capable of being activated. The customer completes the purchase at the POS device. In some embodiments, upon purchase of the product, the record associated with the customer is immediately activated and the product is available for use by the customer. However, in some embodiments, the user may be required to perform one or more actions to activate the product, such as by selecting an activate option or receiving and entering a redemption code.

Figure 4:
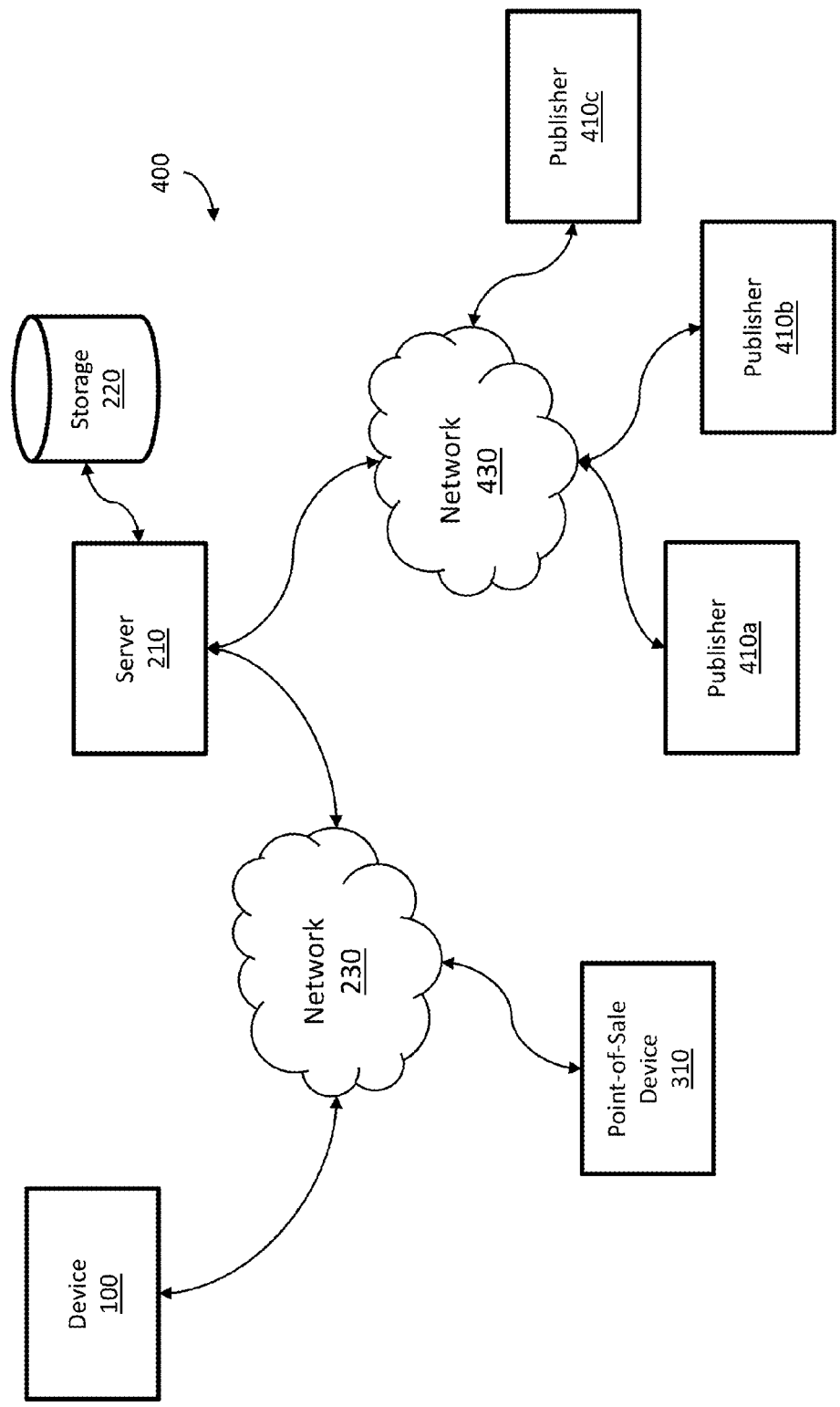

Referring now to FIG. 4, FIG. 4 shows a system 400 for product purchase and registration according to one embodiment. The embodiment shown in FIG. 4 comprises a system having a point of sale aggregator server 210 that serves as an intermediary or substitute for servers for various specific software publishers. For example, in one embodiment, a point of sale aggregator may be used to provide a single site through which a number of software products for a number of different publishers may be purchased and activated. For example, a retail store may have maintain a server or servers for allowing product purchase and registration from multiple different software publishers from a single seller.

In the embodiment shown in FIG. 4, the system 400 comprises a handheld device 100, a server 210 in communication with data storage 220, and a POS device in communication over a network 230. In addition, the system comprises a plurality of servers for particular software publishers 410*a-c* that are in communication with the server 210 via a network 430. In the embodiment shown in FIG. 4, the server 210 provides a single point of contact for purchasing and registering products purchased at a store or via website. Thus, upon receiving information associated with a product from a device 100 (as will be described in greater detail below with respect to FIGS. 5-6), the server 210 responds to the device 100 rather than a publisher's server 410*a-c*. After a product is sold, the retail chain's server 210 may notify the respective publisher 410*a-c* of the sale, or in some embodiments, the publisher 410*a-c* may not be notified. Further, subsequent activation of a product (as will be described in detail with respect to FIGS. 5-6) may occur solely through the retail chain's server 210 rather than the respective publisher 410*a-c*, though in some embodiments the respective publisher 410*a-c* may be notified of the activation or the respective publisher 410*a-c* may perform product activation independently of the retail chain.

For example, a large retail chain may sell a number of software products from a number of publishers. The retail chain may enter into agreements with one or more publishers to perform purchase and registration functionality on behalf of the one or more publishers. In such an embodiment, a customer of the retail chain may create an account with the retail chain. The retail chain may then associate the customer's account with the customer's account(s) with one or more publishers 410*a-c*. Thus, when a customer purchases a product from the retail chain, purchase and registration requests are sent to the retail chain's server(s) 210 rather than to servers for particular publishers. Similarly, the customer may activate the product via the retail chain server rather than via the respective publisher's servers. Subsequently, redemption and activation information from the aggregator's server 210 may be transmitted to the respective publisher 410*a-c* or to the user's account with the respective publisher.

Figure 5:
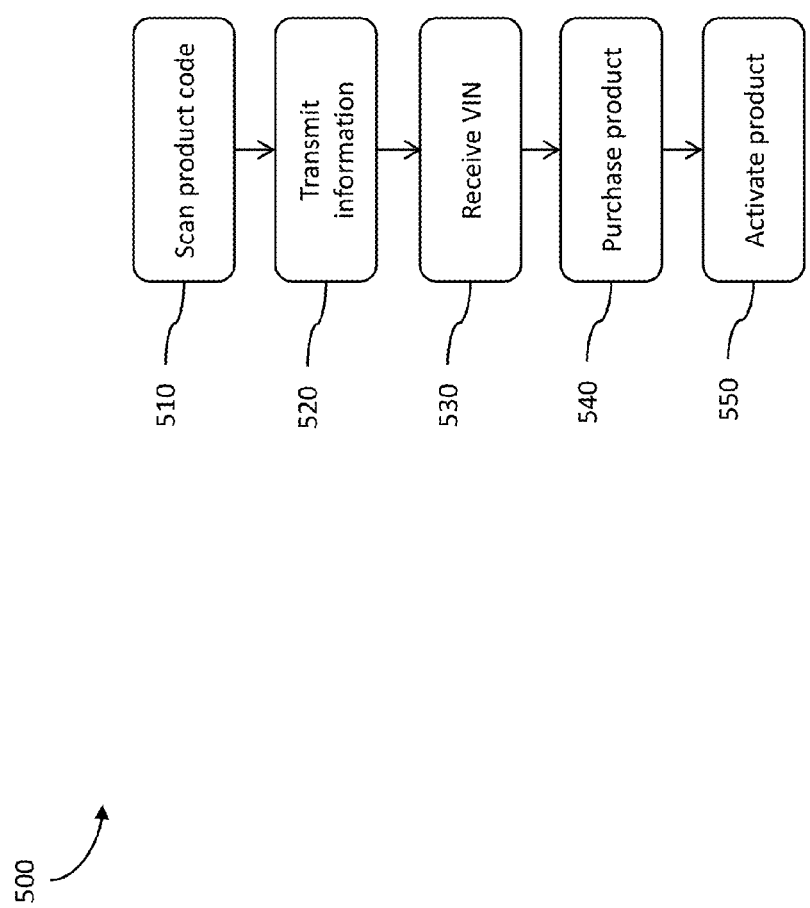
FIGS. 5-6 show methods for product purchase and registration according to embodiments.

Referring now to FIG. 5, FIG. 5 shows a methods 500 for product purchase and activation according to one embodiment. The method 500 shown in FIG. 5 will be described with respect to the system 300 shown in FIG. 3, but is not restricted to use only on the system 300 of FIG. 3. Other embodiments according to this disclosure are suitable for performing the method 500 of FIG. 5, such as the systems 100, 200, 400 shown in FIGS. 1, 2, and 4, respectively, as well as other systems within the scope of this disclosure. Note that while the descriptions below, as well as throughout this disclosure, discusses a "customer," embodiments according to this disclosure are not restricted to use by customers in commercial transactions and may be performed by any individual(s) or entity(ies) according to various embodiments. Similarly, references to "purchases" do not require an exchange of money or other value. For example, promotions and gifts may be purchases, as may trades or other exchanges.

Method 500 begins in block 510 when a customer captures a product code using handheld device 100. In this embodiment, to captures the product code, the customer executes a software application for product purchase and registration according to one embodiment. In this embodiment, the application enables the customer to capture an image of a QR code associated with a product to be purchased. For example, the customer may browse a number of products sold at a retail store, each product having an associated QR code identifying the product. After the customer identifies a desired product, the customer uses the handheld device 100 and the application to capture an image of the appropriate QR code. In some embodiments, a user may have a handheld device 100 that does not have a software application for product purchase and registration. In one such embodiment, the user may capture a product code, which may comprise information to direct the handheld device 100 to a location from which a suitable software application according to this disclosure may be obtained. After obtaining the application, the application may be provided with the captured product code, or the user may re-capture the product code using the software application.

In another embodiment, upon entering a retail store, the store may provide the user with a handheld device 100 for product purchase and registration according to one embodiment. In this embodiment, the user may swipe a credit card or debit card in the device or may enter information identifying the customer to activate the device. The handheld device may access an account associated with the user, such as a store account, or an account identified by the user. The user then uses the handheld device 100 to capture one or more product codes. For example, the user may use the device to capture a QR or UPC or other code associated with the product. After capturing a product code, the method 500 proceeds to block 520.

In block 520, the application transmits information to the remote server 210. In one embodiment, the application executed by the handheld device extracts information from, or determines information based on, the captured product code and transmits at least a portion of the information to the remote server 210. For example, in one embodiment, the application may identify a QR code within a captured image and extract information from the QR code. In one embodiment, the application may identify a UPC code or a bar code in a captured image and extract information from the captured code. In a further embodiment, the application may capture text or other patterns within an image and extract information from the text or patterns. In still a further embodiment, a handheld device may capture a code using a scanner, such as a laser scanner, and interpret or determine information based on the captured information. One of skill in the art is aware of encoding mechanisms used in various types of QR codes, bar codes, and UPC codes. However, other types of encodings may be used as well, including proprietary or other codes that may become available in the public domain. And while in some embodiments, information may extracted from a captured code, in some embodiments, the captured code itself may be transmitted to the remote server 210, which then may extract information from the captured code.

In some embodiments, other information may be transmitted to the server 210. For example, in one embodiment, the device 100 may transmit customer identity information, such as a name or email address or account information associated with the customer. After the information has been transmitted to the remote server 210, the method proceeds to block 530.

At block 530, the handheld device 100 receives a vendor identification number (VIN). For example, in one embodiment, the remote server 210 generates and transmits a VIN to the handheld device 100, which receives it. In one embodiment, a different server or device transmits the VIN to the handheld device 100.

In the embodiment shown in FIG. 5, the handheld device 100 receives a VIN. In embodiments according to this disclosure, a VIN may comprise a string of letters, numbers, or other characters or glyphs that identifies a copy of a product, such as a software product. In some embodiments the device 100 may also receive a universal product code (UPC) or a redemption code. Such an embodiment may allow the customer to provide the VIN and the UPC to a POS device to allow the POS device to (a) look up the correct price for the product, and (b) contact the correct publisher regarding the purchase, as will be discussed in greater detail below. In some embodiments, the handheld device 100 may only receive a VIN. In other embodiments, however, the handheld device 100 may receive a redemption code and other information. In one such embodiment, the redemption code may be received only after the purchase is confirmed to the remote server 210, such as by the POS device. After receiving the redemption code, the method proceeds to block 540.

In block 540, the customer purchases the product. In the embodiment shown in FIG. 5, after receiving the VIN, the user approaches a POS device, such as a cash register, and interacts with a cashier to purchase the selected product. In this embodiment, the handheld device can be commanded to display the VIN to allow the cashier to scan it. In this embodiment, the cash register employs the VIN to look up the prices of the software product and employs the VIN to communicate with the remote server 210 associated with the VIN. In some embodiments, as mentioned above, the customer may receive both a VIN and a UPC. In one such embodiment, the customer may cause the VIN and the UPC to be displayed such that the POS device may scan both codes, for example to access price information using the UPC and to transmit the VIN to the remote server. During or after completion of the purchase, the POS device transmits information, such as the VIN, to the remote server 210 to indicate that the product has been purchased.

While in some embodiments, a user may not receive a redemption code directly, such a code may be associated with the user's account and may be used by the user to activate the product, such as by the user selecting an option to activate the product. But in some embodiments, the customer may receive the redemption code. For example, in one embodiment, the customer may select an option to receive the redemption code rather than having the redemption code automatically associated with the customer's account. In one embodiment, the customer may not have an account and thus the redemption code is provided to the user as it cannot be associated with a customer account.

In other embodiments, other purchase mechanisms than traditional cashier POS interactions may be employed. For example, as was discussed above, a customer may obtain a handheld device 100 at a retail store and swipe a credit card or enter access credentials to access a customer account. The customer may then perform the steps of the method 500 shown in FIG. 5 to select a product for purchase. However, at block 540, rather than approaching a cashier, the user may purchase the product using the handheld device 100. For example, if the customer swiped a credit card to activate the device, the customer may simply purchase the product by indicating to the device to purchase the product using the previously-provided credit card information. In one embodiment where the user provided access credentials for a customer's account, such as a login name and password, the user may simply indicate to the device to purchase the product using a credit card or other payment account associated with the customer account. In some embodiments, a customer may provide other information to purchase the selected product, such as bank account information (e.g. routing and account numbers), online payment information (e.g. PayPal® account information), gift card information, pre-paid debit card information, or other payment information. Upon providing payment information, the purchase may be completed and the VIN may be transmitted to the remote server, where the server notes that the VIN has been sold. In some such embodiments, the customer may be able to complete the entire transaction of selecting and purchasing a product simply by using a handheld device. In addition, in some embodiments to accommodate a user who wishes to receive a redemption code, the handheld device 100 may also comprise a small printer to print out a redemption code for the user to take with them when they leave the store, it may send an email to the user with the redemption code embedded within the email, or it may save the redemption code with the user's account. In one embodiment, the handheld device may comprise the customer's smartphone running an application that allows for payment to be performed using the customer's smartphone, such as by using a process similar to that described above. After the customer purchases the product in block 540, the method proceeds to block 550.

In block 550, the product is activated. In some embodiments, the product is activated in response to an indication of sale being provided to a remote server. For example, in an embodiment in which a customer provided user account information to the software application, a software publisher's server may have associated a VIN and a corresponding redemption code with the customer's account. Thus, upon purchasing the product, the VIN is marked as sold and, since the corresponding redemption code is associated with the user's account, the redemption code is automatically redeemed and the user may immediately install and use the product. However, in some embodiments, the product may not be automatically activated. For example, in on embodiment, the customer may access their customer account and select an option, such as a button or similar user interface feature, to activate the product. In one such embodiment, the user is never provided with the redemption code itself. Rather, the redemption code is associated with the account and, upon receiving the user's command to activate the product, the redemption code is redeemed and the product is activated. In some embodiments, the user may be able to retrieve the actual redemption code or manually enter the redemption code.

For example, in one embodiment, the user activates the product by downloading a software installation package to a device, such as the customer's desktop or laptop computer, installs the software product, and enters the redemption code when prompted by the software product. The software product then verifies the redemption code and activates the product. For example, in one embodiment, the installed software product determines that a redemption code is valid and performs operations on the installed software to render the software usable. In one embodiment, the user logs into (or creates) an account with the publisher of the software product, such as an Adobe® account, identifies the product that has been purchased, and enters the redemption code. The software publisher then verifies the redemption code, such as to ensure that the record associated with the redemption code has been marked as sold and has not already been activated, and activates the product. The customer may then install the software product and provide publisher account information (e.g. Adobe® account information) to verify that the user has activated the product.

In one embodiment, the user may provide the redemption code to another person, such as a gift. In one embodiment, the customer may access an account associated with the software publisher, such as an account with Adobe®. The customer may then select an option to transfer a redemption code to another person. If the recipient has an account, the customer may identify the recipient, such as by entering the recipient's email address associated with her Adobe® account. After confirming that the customer wishes to transfer the redemption code, the redemption code is then transferred to the recipient's account and is available to be used by the recipient to activate the software product. In an embodiment in which the recipient does not have an account with the software publisher, the customer may provide an email address for the recipient and an email may be generated and transmitted to the recipient indicating that the redemption code has been transferred to them and that they need to create an account with the publisher to receive and use the redemption code.

In another embodiment, as was discussed above with respect to FIG. 4, in some cases, a point of sale aggregator may allow a user to purchase and activate products via an account with the point of sale aggregator rather than directly with a software publisher. In such an embodiment, the customer may interact with the POSA rather than with the publisher itself and may thus activate products via the POSA account rather than with a separate account with one or more software publishers.

Figure 6:
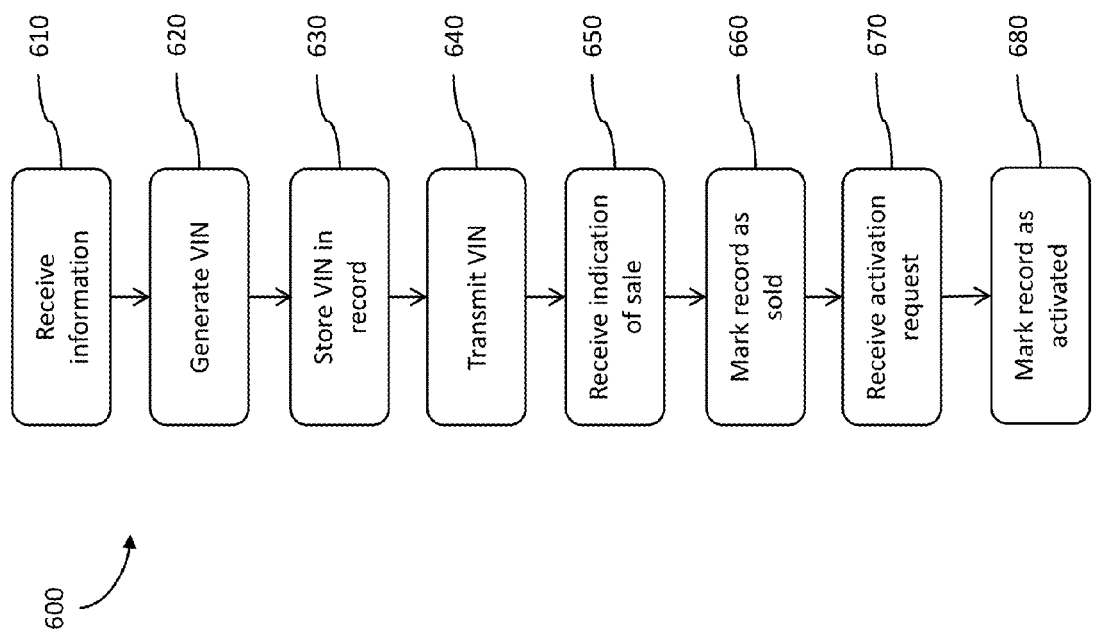

Referring now to FIG. 6, FIG. 6 shows a method for product purchase and registration according to one embodiment. The method 600 shown in FIG. 6 will be described with respect to the system 300 shown in FIG. 3, but is not restricted to use only on the system 300 of FIG. 3. Other embodiments according to this disclosure are suitable for performing the method 600 of FIG. 6, such as the systems 100, 200, 400 shown in FIGS. 1, 2, and 4, respectively, as well as other systems within the scope of this disclosure.

The method of FIG. 6 begins in block 610 when the server 210 receives information, such as from a handheld device 100. In this embodiment, the server 210 receives product information, such as information based on information from a QR code or entered by a customer, such as via a form field on a website. In one embodiment the server 210 receives the information over the Internet. In some embodiments, the server 210 may receive additional information, such as user identity information or information associated with a user account, such as a user account with a software publisher or with a point of sale aggregator. After receiving the information, the method 600 proceeds to block 620.

In block 620, the server 210 generates a VIN. In one embodiment, a number of VIN have been pre-generated and thus generating a VIN for one embodiment comprises selecting an available VIN from a pool of pre-generated VINs. For example, in one embodiment, a software publisher may receive a purchase order (PO) from a retail store for a quantity of a particular software product for resale by the retail store. The software publisher may then generate a corresponding number of VINs associated with the PO from the retail store and mark each as unsold (as will be described below). In some embodiments, the software publisher may generate unique pairs of numbers, such as a VIN and a redemption code pair. In one such embodiment, each VIN and redemption code is unique, and each VIN is associated with a single redemption code as a pair. In such an embodiment, the VIN may be used by the POS device to communicate with the software publisher, while the redemption code is only provided to the customer who is purchasing the product or only associated with the customer's account. In some embodiments, the server may generate a VIN, or VIN/redemption code pair, by generating a random string of letters, numbers, or other characters or glyphs, or by executing one or more algorithms to generate a VIN. In some embodiments, the server 210 may generate a VIN or VIN/ redemption code pair by requesting such information from another device, such as a database (e.g. data storage 220) or from another server. For example, in one embodiment based on the embodiment shown in FIG. 4, the server 210 may transmit a request for a VIN or VIN/redemption code pair to the appropriate publisher 410*a-c*, and, in response to the request, may receive a VIN or VIN/redemption code pair from the publisher 410*a-c*. After generating the VIN, the method proceeds to block 630.

In block 630, the server 210 stores the VIN in a record. For example, in one embodiment, the server 210 causes a database record to be created in a database, the database record comprising the VIN. FIG. 7 shows an example of suitable database records according to one embodiment. In the embodiment shown in FIG. 7, each database record includes a redemption code, a VIN, a "reserved" flag, a "sold" flag, and an "activated" flag. In some embodiments, the database record may comprise other data as well, or different data fields, such as a product identifier, a creation date, a product version, or other suitable data. In one embodiment, the server 210 transmits the VIN to a database management system as a part of a command to create or update a database record to store the VIN. In one embodiment, such an embodiment according to the system 400 shown in FIG. 4, the server 210 may transmit the redemption code to an appropriate publisher 410*a-c* to be store.

In addition, in one embodiment, the server 210 may also store data indicating whether the product is available to be activated. For example, in one embodiment, a VIN and redemption code pair is generated after information is received in block 620. The VIN and redemption code are stored in a database record comprising fields for the VIN, the redemption code and for several flag values, including a reserved flag, a sold/unsold flag, and an activated flag, such as may be seen in FIG. 7. Initially, the reserved flag is set to 'reserved' and the sold/unsold flag is set to 'unsold' to indicate that while the redemption code has been generated and the product has been reserved for a potential pending sale, the associated product has not been sold and thus the redemption code may not be used to activate the associated product.

As mentioned previously, a reserved flag may be used to reserve a VIN or VIN / redemption code pair (or other identifier) so that the same information is not provided to a subsequent customer. While the terms 'sold' and 'unsold' are used, these terms are used as one example in the context of a commercial sale of a software product. For example, when the VIN is stored in a record, the server 210 may mark the record as reserved and also associate the record with the customer's account, such as based on received customer account information. If a second customer then sends product information to the server, the server will not provide the same VIN as the record is marked as reserved. In some embodiments, the reserved flag may expire after a period of time, such as 30 minutes or 24 hours. Thus, the VIN may become unreserved if sufficient time elapses that the server determines that the customer elected to not purchase the product.

In some embodiments, a field may be set with a value to indicate that a redemption code is active or inactive, or otherwise indicate whether a VIN or VIN/redemption code pair may be used to activate a product. In some embodiments, no such field may be used and a VIN or VIN/ redemption code pair is always active. In one such embodiment, a VIN or VIN/redemption code pair is stored in one record when it is active and usable to activate a software product, and, after the VIN or VIN/redemption code pair has been used, it may be deleted from such the record and stored in another record, such as in a database storing "used" redemption codes. After the VIN has been stored, the method 502 proceeds to block 640.

In block 640, the server 210 transmits the VIN. In one embodiment, the server 210 transmits the VIN to the device 100 from which the server 210 received the information. In one embodiment, the server 210 subsequently transmits the redemption code in response to receiving an indication of sale of the product (as will be described in greater detail below) and may transmit the redemption code to the device or a POS device. In one embodiment, the server 210 transmits the VIN and other information, such as a product code, including a UPC. In some embodiments, the server 210 may transmit other information, such as rebate information, coupon information, or other promotional information, such as information about other products offered by the publisher (e.g. a product overview). In one embodiment, for example, the server 210 may transmit information about another product and a coupon or rebate information for a discounted price on the other product.

In one embodiment, as described above, the server 210 may receive information about a customer, such as an email address or account information with a publisher. In one such embodiment, the server 210 may transmit the VIN to the provided email address or associate the VIN with the account. Such actions may be in addition to, or instead of, transmitting the redemption code to the device 100 or other device (e.g. a POS device). After the redemption code has been transmitted, the method proceeds to block 650.

In block 650, the server 210 receives an indication of sale. For example, in one embodiment, the server receives a message from a POS device, such as a cash register, indicating that the product associated with the VIN has been purchased. For example, the POS device may transmit the VIN information to the server 210 to indicate the sale. In one embodiment, the server 210 receives a message from a device 100 indicating that a customer has completed a purchase of the product, such as by swiping a credit card in the device 100 or by purchasing the product using a customer account with a retail store or with a point of sale aggregator. In some embodiments, the server 210 may also receive authentication information with the indication of sale, such as encoded or encrypted information identifying the seller of the software product or identifying the device that sold the software product. Such information may be transmitted to confirm to the server 210 that the indication of sale is transmitted by an authorized seller of the software product and may be required to cause a redemption code to be usable or the product to be activatable. After the indication of sale has been transmitted, the method proceeds to block 660.

In block 660, the server 210 marks the record associated with the VIN as sold. As described above, in one embodiment, a record comprises a VIN, a redemption code and a sold/unsold field. In one such embodiment, the server 210 may cause the value of the sold/unsold field to be set to 'sold.' As will be described below, setting a sold/unsold field to 'sold,' indicates that the redemption code is active and may be used to activate a copy of the software product. As discussed above, the use of the terms 'sold' and 'unsold' is simply a convenience for some embodiments according to this disclosure and should not be interpreted to mean that methods according to this disclosure may only be used in the context of commercial sales of a product. Rather, the 'sold' and 'unsold' terms represent a broader concept of whether a redemption code may be used to activate a software product, and thus other terms or conventions may be used in various embodiments. Further, as discussed above, a marking a record as sold does not necessarily require changes to a record. For example, in one embodiment in which a database comprises a relational database, a record may be deleted from a first database table comprising usable VINs or VIN/redemption code pairs, and a record may be added to a second database table comprising used or unavailable VINs or VIN/redemption code pairs. In some embodiments, the step of activating or enabling a VIN or VIN/redemption code pair may be implicit with the creation of the VIN or VIN/redemption code pair, such that creation of the VIN or VIN/redemption code pair causes it to become active. After the VIN or VIN/redemption code pair is marked as sold, the method proceeds to block 670.

In block 670, the server 210 receives an activation request. In one embodiment, the server automatically activates a product based on the indication of sale. In some embodiments, a customer must explicitly activate a product. For example, as discussed previously, the customer may access a web page associated with her account and click a button to send an activation request to activate the product. In one embodiment, a user may manually enter a redemption code when installing a software product and the server receives a message from a copy of a software product that is being installed by a customer. In such an embodiment, the software product transmits a message to the server 210, the message comprising the redemption code. In one embodiment, the server 210 receives an activation request from a user account associated with a software publisher or a point of sale aggregator. In some embodiments, the activation request may comprise additional information, such as authentication information associated with a user account. For example, in one embodiment, as a user installs a software product, the software product may request the user to enter account information associated with the creator of the software product (e.g. Adobe®) as well as a redemption code. In one embodiment, as a user installs a software product, the software product may request the user to enter account information associated with the creator of the software product (e.g. Adobe®) rather than a redemption code. In one such embodiment, the software product may provide the user account information to the server 210, which may then determine whether an active redemption code for the software product is associated with the user account.

In one embodiment, the activation request may occur upon a sale of a software product. For example, in one embodiment, a software product may be available via a periodic subscription (e.g. yearly). In one such embodiment, upon completion of the sale and receipt of an indication of the sale, the server 210 interprets the indication of the sale as the activation request as well. In some such embodiments, block 640 of the method 600 of FIG. 6 may never be executed and a redemption code may never actually be transmitted to the device 100 or to the customer. After the activation request has been received, the method 600 proceeds to block 680.

In block 680, the server 210 marks the redemption code as used. For example, in one embodiment, the server 210 updates a database record to change a database field, such as a "an activated" field, associated with the redemption code from 'U' to 'A' to indicate that the redemption code has been redeemed and the product has been activated. In one embodiment, the server 210 copies the database record, or information from the database record, from a database record associated with active redemption codes into a database record associated with inactive redemption codes. In one embodiment, the server 210 transmits a message to another server 210 to indicate that the redemption code has been used to activate a product. In some embodiments, a redemption code may have a number of uses associated with it. For example, a company may purchase 10 licenses for a software product, but only receive a single redemption code. Each time a copy of the software product is installed, the redemption code may be entered and a count associated with the redemption code may be decremented. In some embodiments the count may be incremented if additional licenses are purchased according to embodiments disclosed herein.

It should be noted that the methods 500, 600 shown in FIGS. 5 and 6 comprise a number of steps that are performed in a particular order in some embodiments. However, the depicted steps and orders are illustrative only and may be performed in different orders or one or more blocks may be omitted or repeated in some embodiments. For example, in the embodiment shown in FIG. 5, block 540 may be performed before block 530. In such an embodiment, the purchase occurs prior to the customer receiving the redemption code. In some embodiments, block 530 may not occur. For example, a customer may purchase a software product, which is then automatically activated such that the customer never receives the redemption code. For example, the product may be associated with the customer's account and activated upon purchase of the product. Use of the product may then require the customer to provide access credentials for the account.

Similarly, with respect to the method of FIG. 6, the ordering of steps is illustrative. For example, generation of the redemption code may occur prior to receiving information from a device 100. In some embodiments, as described above, the step of receiving an indication of sale may comprise the activation request or may cause activation of the software product without a separate request for activation being received.

While embodiments herein have been described with respect to software products, this disclosure is not limited to the purchase and registration of software products. Other types of products may be suitable for use with one or more systems or methods according to this disclosure, such as electronic devices, gift cards, prepaid debit cards, or other types of products.

General

While the methods and systems herein are described in terms of software executing on various machines, the methods and systems may also be implemented as specifically-configured hardware, such a field-programmable gate array (FPGA) specifically to execute the various methods. For example, referring again to FIG. 5-B, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to "one embodiment" or "an embodiment" means that a particular feature, structure, operation, or other characteristic described in connection with the embodiment may be included in at least one implementation of the disclosure. The disclosure is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
receiving a product identifier and user account information from a remote device associated with a user via a communications network, the product identifier identifying a product that was scanned at a retail store by the remote device;
responsive to receiving the product identifier, generating a vendor identification number (VIN) and a redemption code for one unallocated, individual copy of the product and associating the VIN and the redemption code to create a unique pairing of the VIN and the redemption code;
storing the unique pairing as a record in a database, the unique pairing associated with the product identifier, wherein the record comprises a VIN data field including the VIN, a redemption code data field including the redemption code, a sold flag data field, an activated flag data field, and a reserved flag data field;
transmitting the VIN to the remote device and marking the record in the database to set a reserved flag in the reserved flag data field indicating that the copy of the product is reserved for a pending sale;
receiving an indication of a sale of the copy of the product from a point of sale device, the indication of the sale comprising the VIN;
responsive to receiving the indication of the sale, marking the record in the database to set a sold flag in the sold flag data field and to set an active flag in the activated flag data field;
associating the redemption code with a user account associated with the user account information;
receiving an activation request for the copy of the product; and
responsive to receiving the activation request and determining that the redemption code is active, activating the copy of the product.

2. The method of claim 1, wherein the activating the product further comprises associating the copy of the activated product with the user account.

3. The method of claim 2, further comprising transmitting a notification to a remote server, wherein the remote server is associated with a publisher of the product and the notification indicates at least one of the sale or the activation.

4. The method of claim 1, wherein the user account is a first user account, and further comprising, prior to receiving the activation request:
receiving second user account information, the second user account information identifying a second user account;
receiving an indication to transfer the association of the redemption code from the first user account to the second user account;
associating the redemption code with the second user account and disassociating the redemption code from the first user account; and
wherein the activation request is received from the second user account.

5. The method of claim 4, further comprising associating the activated product with the second user account.

6. A non-transitory computer-readable medium comprising program code, the program code comprising:

program code for receiving a product identifier and user account information from a remote device associated with a user via a communications network, the product identifier identifying a product that was scanned at a retail store by the remote device;

program code for, responsive to receiving the product identifier, generating a vendor identification number (VIN) and a redemption code for one unallocated, individual copy of the product and associating the VIN and the redemption code to create a unique pairing of the VIN and the redemption code;

program code for storing the unique pairing as a record in a database, the unique pairing associated with the product identifier, wherein the record comprises a VIN data field including the VIN, a redemption code data field including the redemption code, a sold flag data field, an activated flag data field and a reserved flag data field;

program code for transmitting the VIN to the remote device and marking the record in the database to set a reserved flag in the reserved flag data field indicating that the copy of the product is reserved for a pending sale;

receiving an indication of a sale of the copy of the product from a point of sale device, the indication of the sale comprising the VIN;

program code for, responsive to receiving the indication of the sale, marking the record in the database to set a sold flag in the sold flag data field and to set an active flag in the activated flag data field;

program code for associating the redemption code with a user account associated with the user account information;

program code for receiving an activation request for the copy of the product; and program code for, responsive to receiving the activation request and determining that the redemption code is active, activating the copy of the product.

7. The non-transitory computer-readable medium of claim 6, wherein the program code for activating the product further comprises program code for associating the copy of the activated product with the user account.

8. The non-transitory computer-readable medium of claim 7, further comprising program code for transmitting a notification to a remote server, wherein the remote server is associated with a publisher of the product and the notification indicates at least one of the sale or the activation.

9. The non-transitory computer-readable medium of claim 6, wherein the user account is a first user account, and further comprising program code for, prior to receiving the activation request:

program code for receiving second user account information, the second user account information identifying a second user account;

program code for receiving an indication to transfer the association of the redemption code from the first user account to the second user account;

program code for associating the redemption code with the second user account and disassociating the redemption code from the first user account, wherein the activation request is received from the second user account.

10. A system comprising:
a computer-readable medium, and
a processor in communication with the computer readable medium, the processor is configured to execute instructions included in the computer readable medium to cause the system to perform operations comprising:

receiving a product identifier and user account information from a remote device associated with a user via a communications network, the product identifier identifying a product that was scanned at a retail store by the remote device;

responsive to reception of the product identifier, generating a vendor identification number (VIN) and a redemption code for one unallocated, individual copy of the product and associating the VIN and the redemption code to create a unique pairing of the VIN and the redemption code;

storing the unique pairing as a record in a database, the unique pairing associated with the product identifier, wherein the record comprises a VIN data field including the VIN, a redemption code data field including the redemption code, a solid flag data field, an activated flag data field, and a reserved flag data field;

transmitting the VIN to the remote device and mark the record in the database to set a reserved flag in the reserved flag data field indicating that the copy of the product is reserved for a pending sale;

receiving an indication of a sale of the copy of the product from a point of sale device, the indication of the sale comprising the VIN;

responsive to reception of the indication of the sale, marking the record in the database to set a sold flag in the sold flag data field and to set an active flag in the activated flag data field;

associating the redemption code with a user account associated with the user account information;

receiving and activation request for the copy of the product; and responsive to reception of the activation request and a determination that the redemption code is active, activating the copy of the product.

11. The system of claim 10, wherein the processor is configured to execute instructions included in the computer readable medium to cause the system to perform operations further comprising associating the copy of the activated product with the user account to activate the product.

12. The system of claim 11, wherein the processor is configured to execute instructions included in the computer readable medium to cause the system to perform operations further comprising transmitting a notification to a remote server, wherein the remote server is associated with a publisher of the product and the notification indicates at least one of the sale or the activation.

13. The system of claim 10, wherein the user account is a first user account, and wherein the processor is configured to execute instructions included in the computer readable medium to cause the system to perform operations further comprising, prior to reception of the activation request;

receiving second user account information, the second user account information identifying a second user account;

receiving an indication to transfer the association of the redemption code from the first user account to the second user account;

associating the redemption code with the second user account and disassociate the redemption code from the first user account;

wherein the activation request is received from the second user account.

\* \* \* \* \*